US006638191B1

(12) United States Patent
Hankins et al.

(10) Patent No.: US 6,638,191 B1
(45) Date of Patent: Oct. 28, 2003

(54) LENGTH ADJUSTABLE BELT TENSIONING ARM

(75) Inventors: Lynn Hankins, Mesa, AZ (US); Fred Tuffly, Mesa, AZ (US)

(73) Assignee: U-Haul International, Inc., Phoenix, AZ (US)

( * ) Notice: Subject to any disclaimer, the term of this patent is extended or adjusted under 35 U.S.C. 154(b) by 0 days.

(21) Appl. No.: 09/436,846

(22) Filed: Nov. 9, 1999

(51) Int. Cl.[7] .............................. F16H 7/14; F16H 7/12; F16H 7/08
(52) U.S. Cl. ...................... 474/113; 474/114; 474/134; 474/101
(58) Field of Search ..................... 474/101, 112–119, 474/135, 134, 121; 198/834, 816; 425/329, 392, 391; 29/203 D, 33 M, 281.1, 446, 745; 248/546, 421

(56) References Cited

U.S. PATENT DOCUMENTS

| 732,238 | A | | 6/1903 | Turbayne | |
|---|---|---|---|---|---|
| 1,920,444 | A | * | 8/1933 | Theon | 474/114 |
| 2,074,078 | A | | 4/1937 | Swift | 74/242.13 |
| 2,131,830 | A | * | 10/1938 | Ackerman | 474/113 |
| 2,263,438 | A | * | 11/1941 | Garvin | 474/113 X |
| 2,953,241 | A | * | 9/1960 | Lehman | 474/113 X |
| 2,970,587 | A | | 2/1961 | Estes | 123/195 |
| 3,915,024 | A | * | 10/1975 | Mort | 474/113 |
| 3,922,927 | A | | 12/1975 | Shiki et al. | 74/242.13 R |
| 4,036,029 | A | | 7/1977 | Francis | 62/243 |
| 4,128,952 | A | * | 12/1978 | Duke et al. | 474/134 X |
| 4,372,440 | A | * | 2/1983 | Ringis | 474/113 X |
| 4,546,832 | A | * | 10/1985 | Dietrich et al. | 172/491 |
| 4,803,804 | A | | 2/1989 | Bryant | 474/113 |
| D355,840 | S | | 2/1995 | Carroll | D8/360 |
| 6,164,949 | A | * | 12/2000 | Lamson | 425/329 |

FOREIGN PATENT DOCUMENTS

| FR | 1185843 | * | 8/1959 | 474/113 |
|---|---|---|---|---|
| JP | 163247 | * | 7/1991 | 474/113 |

* cited by examiner

Primary Examiner—Marcus Charles
(74) Attorney, Agent, or Firm—Jeffer, Mangels, Butler & Marmaro LLP

(57) ABSTRACT

A tensioning device includes an adjustable tensioning arm having first and second opposed ends, a first mounting bracket secured to the first end of the adjustable tensioning arm, and a second mounting bracket pivotally connected to the second end of the adjustable tensioning arm. The adjustable tensioning arm includes a middle member having first and second opposed ends, a first end member engaged with and extending from the first end of the middle member and a second end member engaged with and extending from the second end of the middle member.

13 Claims, 5 Drawing Sheets

LENGTH ADJUSTABLE BELT TENSIONING ARM

FIELD OF THE INVENTION

The present invention relates to devices for tensioning engine belts and more particularly to a length adjustable belt tensioning arm for tensioning engine belts.

BACKGROUND OF THE INVENTION

It is often necessary to tension belts in an engine either when installing a new belt or tightening an older stretched out belt. Prior art arms for tensioning engine belts are well known. An example of a prior art belt tensioning arm 2 is shown in FIG. 1. The belt tensioning arm 2 is fixed in length, has a slot 4 formed therein and a pair of holes in which bolts 6 are inserted for fixedly securing the arm 2 to the engine. A bolt 8 is used to secure the tensioning arm 2 to an engine component having a belt, such as an alternator or the like. To tension the alternator belt, the bolt 8 is loosened. A pry bar, or other extended lever, is placed against the alternator and used to move the alternator and the bolt 8 forward, relative to the tensioning arm 2, thereby tensioning the belt. The bolt 8 is then tightened as the alternator is held in position by the pry bar, thereby securing the alternator in place.

This method of tensioning the alternator belt is effective, but it also presents many unneeded difficulties. For example, an extraneous pry bar is necessary. Using the pry bar can be awkward. The pry bar can also damage engine components. Furthermore it is difficult for the operator to tighten bolt 8 while maintaining tension on the alternator and the belt will loosen if bolt 8 becomes loose.

Other devices for tensioning engine belts are known. However, many of these devices require tearing down a significant portion of the engine to install them, are complicated in operation and are not retrofittable to existing engines without modification to the engine.

A need exists for a tensioning arm that overcomes the aforementioned disadvantages of the prior art and is easily retrofitted in an engine.

SUMMARY OF THE PREFERRED EMBODIMENTS

In accordance with one aspect of the present invention there is provided a tensioning device including an adjustable tensioning arm having first and second opposed ends, a first mounting bracket secured to the first end of the adjustable tensioning arm, and a second mounting bracket pivotally connected to the second end of the adjustable tensioning arm. The adjustable tensioning arm includes a middle member having first and second opposed ends, a first end member engaged with and extending from the first end of the middle member and a second end member engaged with and extending from the second end of the middle member.

In a preferred embodiment, the middle member is an internally threaded tube, the first end member is a first externally threaded rod and the second end member is a second externally threaded rod.

In accordance with another aspect of the present invention there is provided a tensioning device including an adjustable tensioning arm having first and second opposed ends, a first mounting bracket secured to the first end of the adjustable tensioning arm, and a second mounting bracket pivotally connected to the second end of the adjustable tensioning arm. The adjustable tensioning arm includes an elongated threaded rod, and an elongated clevis having a threaded hole formed therein that receives the threaded rod.

In accordance with another aspect of the present invention there is provided a method of adjustably tensioning a belt using a device having an adjustable tensioning arm and first and second mounting brackets connected to the ends thereof. The first mounting bracket is affixed to component A and the second mounting bracket is affixed to component B. The belt is coupled to component A. The method includes the steps of lengthening the adjustable tensioning arm and tightening a pair of elements for preventing rotation of a middle member. The lengthening of the adjustable tensioning arm includes the steps of loosening the pair of elements for preventing rotation of a middle member and rotating a middle member having first and second opposed ends, such that a pair of end members engaged with the first and second opposed ends of the middle member respectively extend further therefrom. The lengthening of the adjustable tensioning arm causes component A to move, thereby tensioning the belt.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
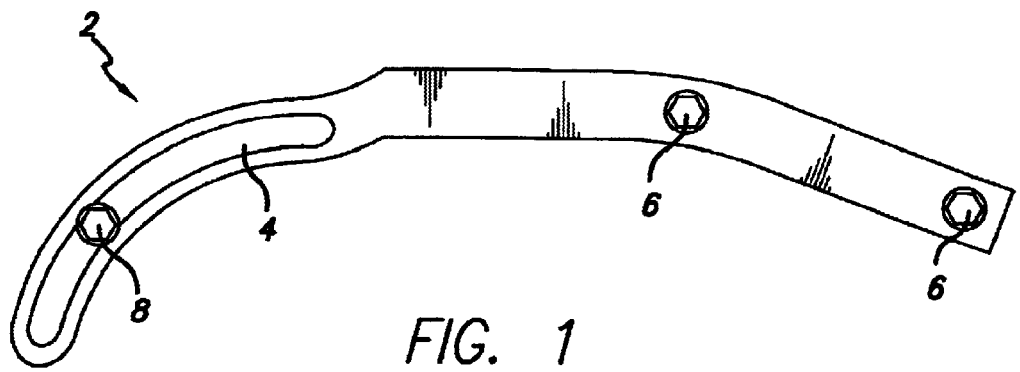
FIG. 1 is a side elevation of a prior art belt tensioning arm.

Described herein are preferred embodiments of a device for tensioning engine belts. Preferably, the device is used in combination with existing engine components. In the embodiments described herein, for exemplary purposes only, the device is provided for tensioning an alternator belt 60. It will be understood, however, that the device can be used to tension other engine component belts as desired, such as the air/vacuum pump belt, the power steering pump or the air conditioning compressor belt, etc. The engine and engine components are all conventional and need only be described to enable a complete understanding of the invention.

Referring to FIGS. 2–5, a first preferred embodiment of a device 10 for tensioning engine belts is shown. Device 10 generally includes an adjustable tensioning arm 12 and first and second mounting brackets 14 and 16. Adjustable tensioning arm 12 includes an internally threaded tube 18, first and second threaded rods 20 and 22, a pair of jamb nuts 24 and a bifurcated connection member 26. Internally threaded tube 18 has first and second ends 18a and 18b in which are threaded first and second externally threaded rods 20 and 22, respectively. First and second threaded rods 20 and 22 are preferably threaded oppositely. In other words, if first threaded rod 20 has right handed threads, second threaded rod 22 has left handed threads, and vice versa. It will be understood, that the threads of internally threaded tube 18 correspond to the threads of first and second threaded rods 20 and 22, accordingly. For example, if first threaded rod 20 has right handed threads, first end 18a of internally threaded tube 18 has right handed threads. Internally threaded tube 18 preferably includes a hex-shaped outer surface with a plurality of opposed flat sections 28 that are adapted to receive a wrench or other tool.

The jamb nuts 24 are threaded onto first and second threaded rods 20 and 22 and are located adjacent first and second ends 18a and 18b of internally threaded tube 18. The jamb nuts 24 are threaded according to the thread configuration of the threaded rod onto which they are threaded. It will be understood that element(s) means for preventing internally threaded tube 18 from rotating is within the scope of the present invention. For example, grommets, washers, clamps and the like can be used.

Bifurcated connection member 26 includes a pair of opposed plates 30 or the like each having an aperture 32 formed therein. Preferably, the plates 30 are attached to second threaded rod 22 via welding or the like in opposed relation, whereby apertures 32 are in axial alignment. Alternatively, the opposed plates 30 can be connected via a middle member and affixed to the end of second threaded rod 22 or bifurcated connection member 26 can include only one plate 30.

Figure 5:
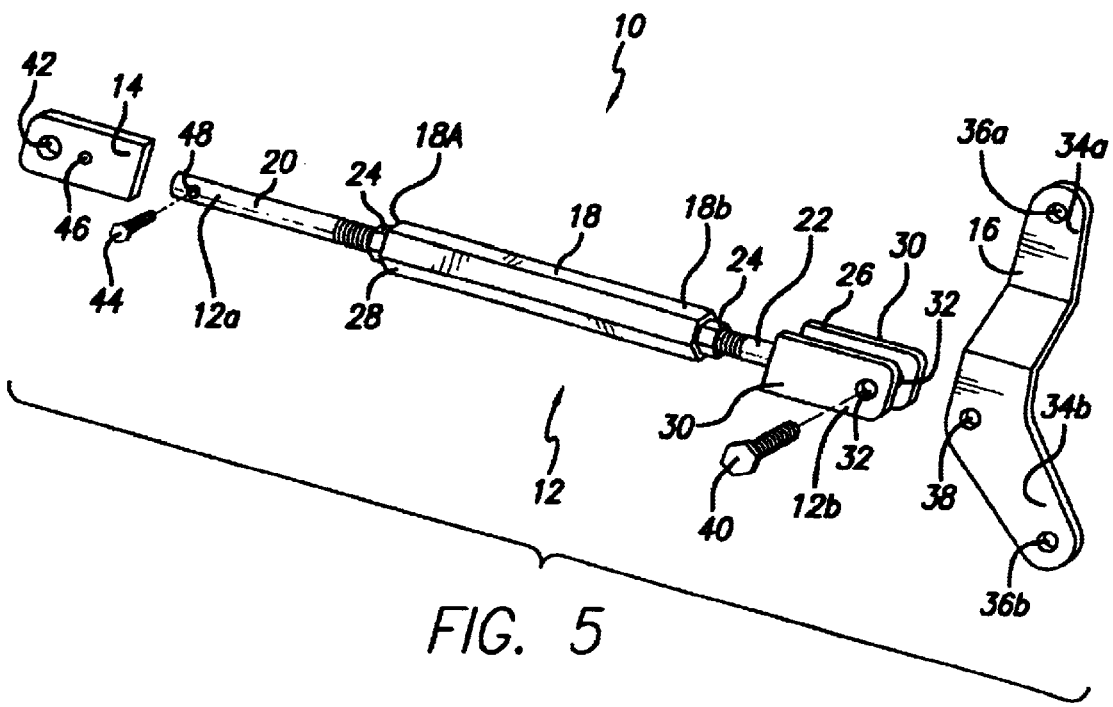
FIG. 5 is an exploded view of the device for tensioning engine belts of FIG. 2.
Figure 6:
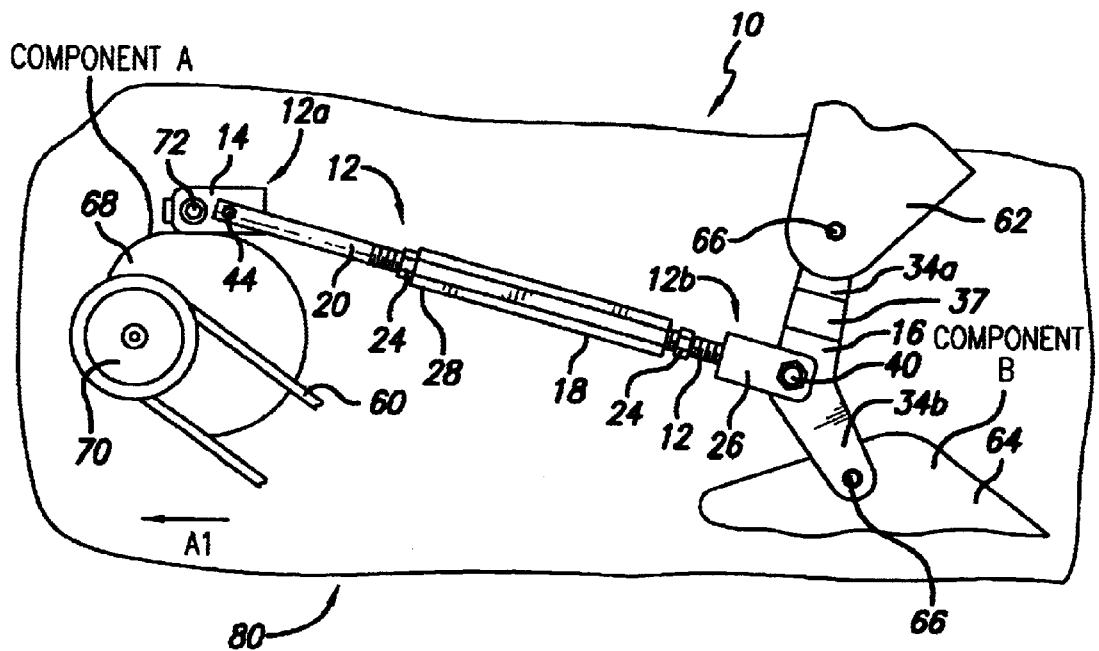
FIG. 6 is a side elevation showing the device of FIG. 2 fixedly secured to an engine.

Referring to FIGS. 5 and 6, second mounting bracket 16 includes two angularly extending ears 34a and 34b, each having an aperture 36a and 36b formed therein, as shown in FIG. 5. Second mounting bracket 16 is designed for rigid mounting to an air conditioner compressor bracket 62 and a water pump 64. Ear 34a preferably has an offset portion 37 that allows for easier mounting of the ear 34a to the air conditioner compressor bracket 62. In operation, the apertures 36a and 36b are engaged by bolts 66 which are threaded into the air conditioner compressor bracket 62 and the water pump 64, respectively, thereby fixedly securing the second mounting bracket 16 to the engine. It will be understood that mounting brackets 14 and 16 can be connected to any engine component or components. What the mounting brackets are mounted to is not a limitation on the present invention.

Second mounting bracket 16 also has aperture 38 formed therein. Adjustable tensioning arm 12, which has first and second ends 12a and 12b is pivotally connected to second mounting bracket 16 at its second end 12b by slipping second mounting bracket 16 between the opposing plates 30 of bifurcated connection member 26, thereby axially aligning apertures 32 and 38, and engaging a bolt 40, pivot pin or the like with apertures 32 and 38. A nut, cotter pin or other conventional securing mechanism can be used to secure bolt 40. Alternatively, aperture 32 of one of the opposed plates 30 can be threaded, thereby allowing bolt 40 to be slipped through apertures 32 and 38 and threaded into the opposite aperture 32.

First mounting bracket 14 is fixedly connected to first end 12a of adjustable tensioning arm 12. Preferably, a bolt 44 engages an aperture 46 in first mounting bracket 14 and an aperture 48 in first end 12a of adjustable tensioning arm 12. However, first mounting bracket 14 can also be secured to adjustable tensioning arm 12 via welding or other conventional securing method. First mounting bracket 14 includes a mounting aperture 42 formed therein through which a bolt or the like can be slipped to secure first mounting bracket 14 to alternator 68.

Preferably all elements of device 10 are comprised of a rigid metal such as steel or the like.

In use adjustable tensioning arm 12 is secured to an engine 80 by fixedly securing second mounting bracket 16 to air compressor bracket 62 and water pump 64, as described above, and fixedly securing first mounting bracket 14 to alternator 68 (which includes alternator pulley 70 with alternator belt 60 thereon) via a bolt 72 or the like. To perform the belt tensioning function, the jamb nuts 24 are loosened. The internally threaded tube 18 is then rotated. It can be rotated using a hand, if possible, or a wrench can be used by engaging the wrench with the opposed flat sections 28. Due to the oppositely threaded first and second threaded rods 20 and 22, as internally threaded tube 18 is rotated in the proper direction (which depends on the thread configuration) first and second threaded rods 20 and 22 further extend from internally threaded tube 18, thereby extending the operating length of adjustable tensioning arm 12 and urging alternator 68 (and alternator pulley 70 and belt 60) in the direction designated by arrow A1 in FIG. 6. This tensions alternator belt 60. When alternator belt 60 is tensioned as desired, the jamb nuts 24 are tightened against ends 18a and 18b of internally threaded tube 18, thereby preventing internally threaded tube 18 from rotating.

Figure 7:
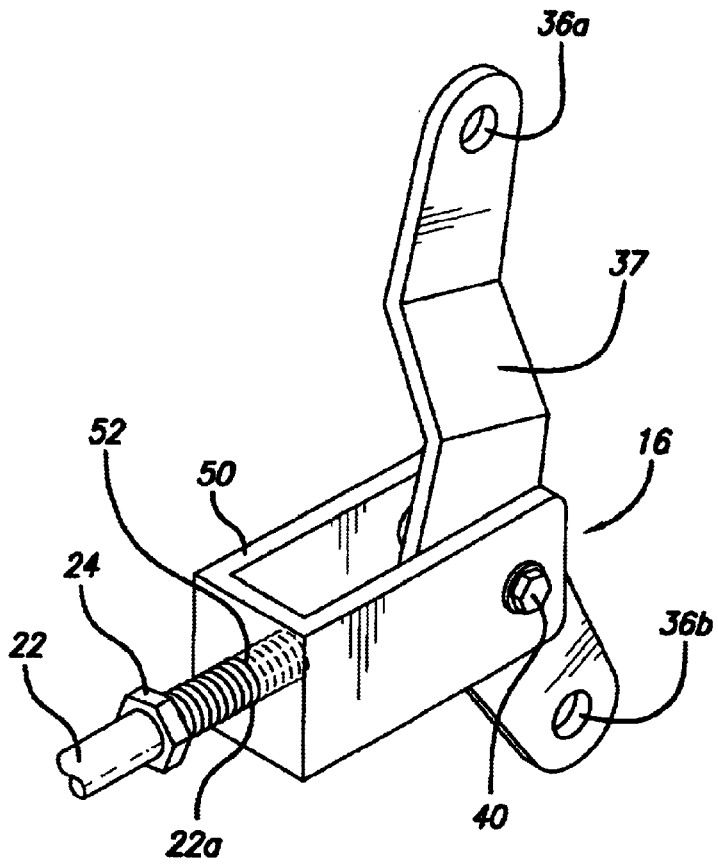
FIG. 7 is an enlarged perspective of a second embodiment of the present invention, in which the second threaded rod is threaded into a clevis which is attached to the second mounting bracket 16.

Referring to FIG. 7, in a second preferred embodiment, the bifurcated connection member can be a clevis 50 having a threaded hole 52 formed therein. In this embodiment, an end 22a of second threaded rod 22 is threaded for engagement with threaded hole 52 defined in clevis 50. A jamb nut 24 is preferably included on the second threaded rod 22 for securing second threaded rod 22 in place. In operation, the jamb nut 24 is loosened, and second threaded rod 22 can be turned as desired, thereby providing additional adjustment of the operable length of adjustable tensioning arm 12.

It will be understood that the thread configurations of the internally threaded tube 18 and first and second threaded rods 20 and 22 (and clevis 50 in the second preferred embodiment) will be readily apparent to one of ordinary skill in the art. The threaded configurations can be changed as desired and are not a limitation on the present invention.

Figure 8:
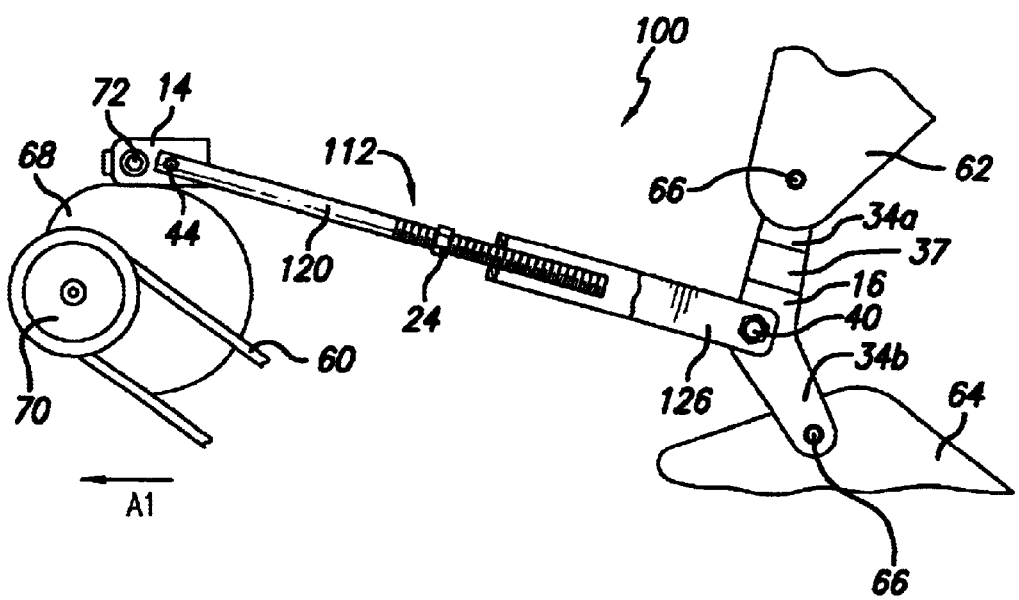
FIG. 8 is a side elevation of a third embodiment of the present invention for tensioning engine belts showing the elongated clevis partially in section.
Figure 9:
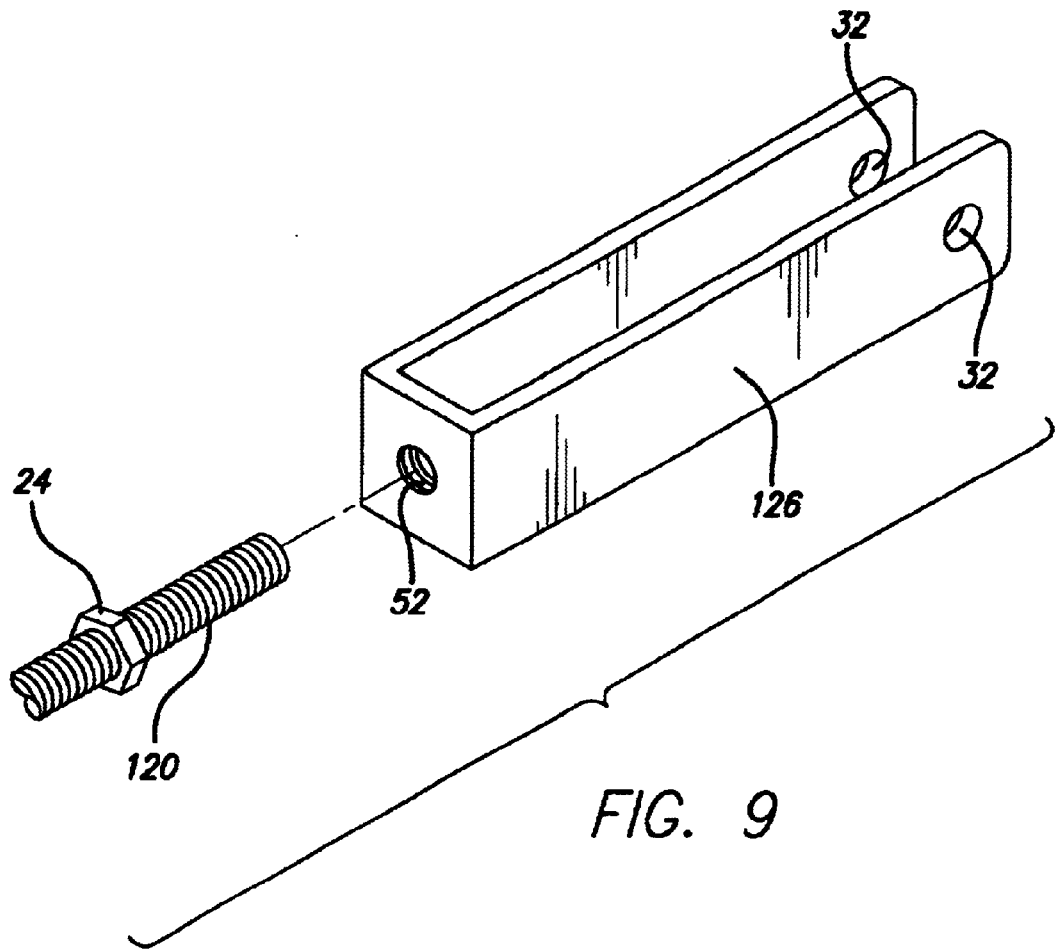
FIG. 9 is an enlarged exploded perspective of the elongated threaded rod and elongated clevis of FIG. 8.

Referring to FIGS. 8–9, a third preferred embodiment of a device 100 for tensioning engine belts is shown. The device 100 generally includes an adjustable tensioning arm 112 and first and second mounting brackets 14 and 16. The adjustable tensioning arm includes an elongated threaded rod 120, having a jamb nut 24 threaded thereon, and an elongated clevis 1 26. The elongated clevis 126 has a threaded hole 52 and two opposed apertures 32 formed therein, as shown in FIG. 9.

Threaded rod 120 is threadedly received by threaded hole 52 of the elongated clevis 126. Elongated clevis 126 is pivotally connected to second mounting bracket 16 by bolt 40, and elongated threaded rod 120 is secured to first mounting bracket 14 by bolt 44 or welding as described above.

In operation, device 100 is secured to an engine by securing first and second mounting brackets 14 and 16 to the engine components as described above. To tension alternator belt 60, jamb nut 24 is loosened and threaded rod 120 is rotated, causing adjustable tensioning arm 112 to lengthen, thereby tensioning the belt. When alternator belt 60 is tensioned as desired, jamb nut 24 is tightened against elongated clevis 126, thereby preventing elongated threaded rod 120 from rotating.

It will be understood that the engine components to which the device for tensioning engine belts is connected are not a limitation on the present invention, but are described herein simply for exemplary purposes. It is within the scope of the present invention to use the device with any engine component having a belt. It will be further understood that the present invention can be used with any device having a belt which requires tensioning.

Figure 2:
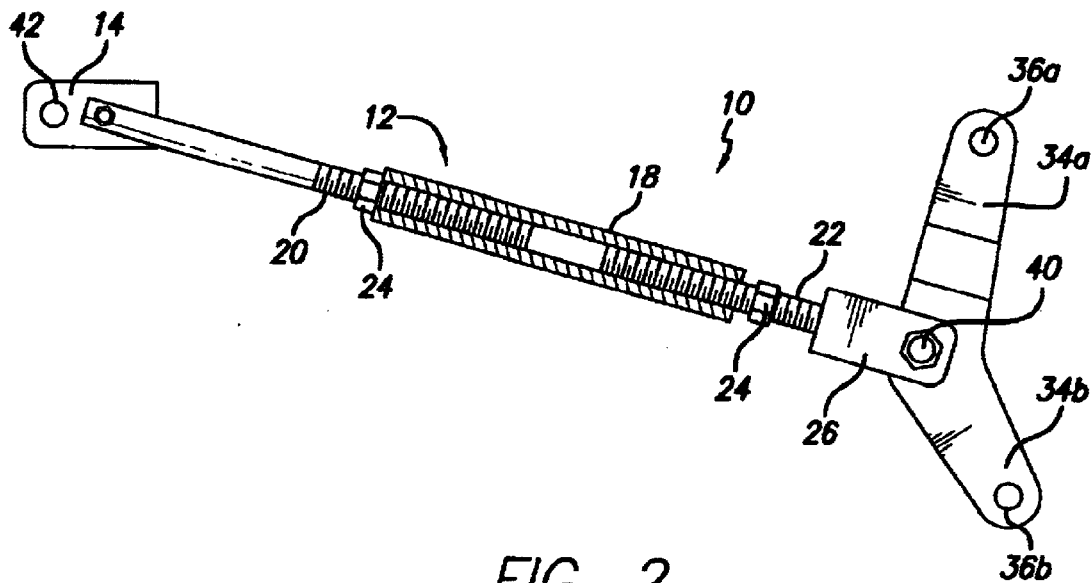
FIG. 2 is a side elevation of a device for tensioning engine belts in accordance with a first embodiment of the present invention showing a first mounting bracket, a second mounting bracket and an internally threaded tube shown in section.
Figure 3:
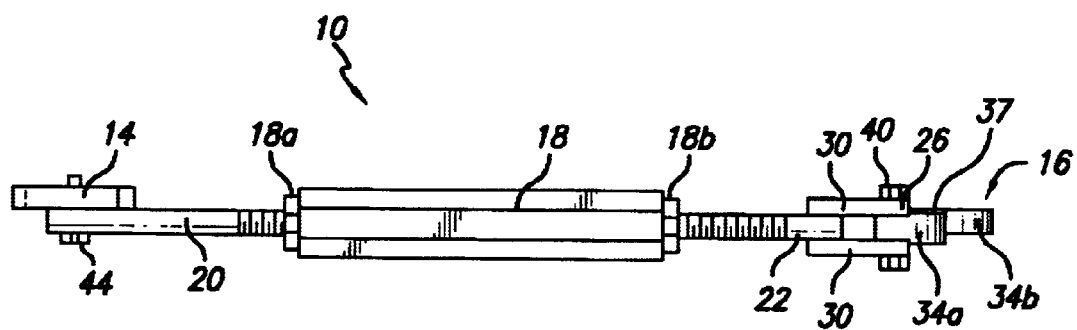
FIG. 3 is a top plan view of the device of FIG. 2.
Figure 4:
FIG. 4 is an enlarged side elevation of the second mounting bracket having an offset portion.
Figure 10:
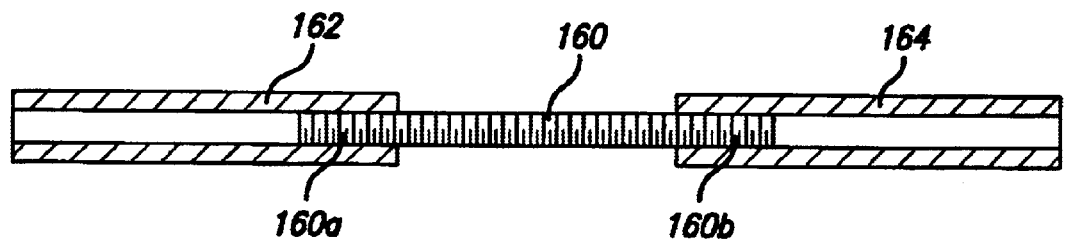
FIG. 10 is a sectional side elevation of an adjustable length tensioning arm including an externally threaded middle rod and a pair of internally threaded tubes in accordance with a modification of the embodiment of the device of FIG. 2.

Referring to FIG. 10, in a modification of the embodiment shown in FIG. 2, internally threaded tube 18 can be replaced by an externally threaded middle rod 160, the opposed ends 160a and 160b of which are threaded oppositely, and first and second threaded rods 20 and 22 can be replaced by internally threaded tubes 162 and 164 that are threadedly engaged with and extend from first and second ends 160a and 160b of externally threaded middle rod 160.

Figure 11:
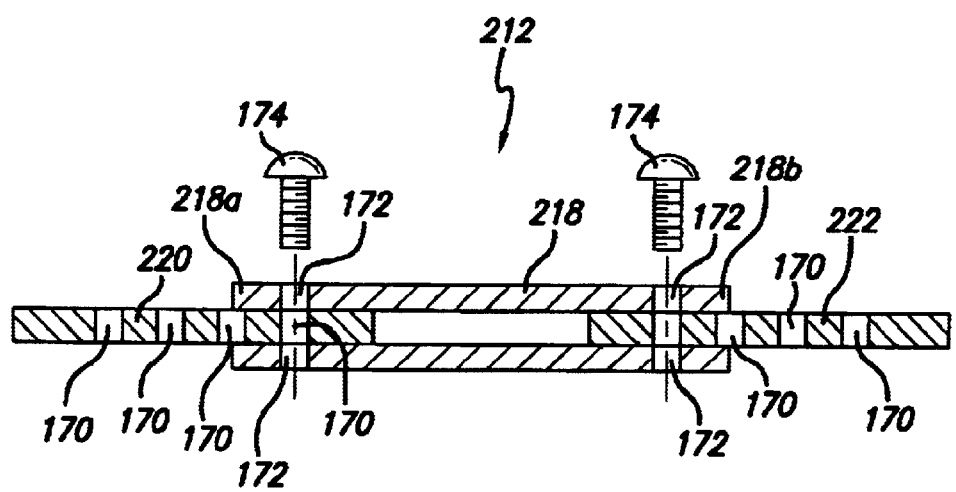
FIG. 11 is an exploded sectional side elevation of an adjustable length tensioning arm having a plurality of corresponding holes defined in the middle tube and the end rods in accordance with another modification of the embodiment of the device of FIG. 2.

Referring to FIG. 11, in another modification of the embodiment shown in FIG. 2, the threads on internally threaded tube 18 and first and second threaded rods 20 and 22 can be omitted. Instead a plurality of holes 170 can be defined in first and second end rods 220 and 222 and corresponding holes can be defined in the ends 218a and 218b of middle tube 218. The holes 170 and 172 can be engaged by a screw 174 (or other fastener) to hold the end rods 220 and 222 in position.

In operation, the adjustable tensioning arm 212 can be adjusted by removing screw 174, extending the corresponding rod to the desired position and then reinserting the screw into hole 172 and the new corresponding hole 170, thereby holding the rod in the desired position.

The embodiments of the present invention recited herein are intended to be merely exemplary and those skilled in the art will be able to make numerous modifications to them without departing from the spirit of the present invention. For example, the second mounting bracket 16 can be omitted and the second end of the adjustable tensioning arm can be pivotally connected directly to the engine. All such modifications are intended to be within the scope of the present invention as defined by the claims appended hereto.

What is claimed is:

1. A tensioning device comprising:

(a) an adjustable tensioning arm having first and second opposed ends, said adjustable tensioning arm comprising
   (i) a middle member comprising an internally threaded tube having first and second opposed ends,
   (ii) a first end member comprising a first externally threaded rod engaged with and extending from said first end of said middle member,
   (iii) a second end member comprising a second externally threaded rod engaged with and extending from said second end of said middle member,
   (iv) a bifurcated connection member having a pair of opposed apertures formed therein, the bifurcated connection member defining a threaded bore adapted to threadedly receive the second end member, and
   wherein the first end member threadedly engages the middle member to provide a first degree of adjustment, wherein the second member threadedly engages the middle member to provide a second degree of adjustment and wherein the second member threadedly engages the bifurcated connection member to provide a third degree of adjustment, (b) a first mounting bracket secured to said first end of said adjustable tensioning arm, and (c) a second mounting bracket including two angularly extending ears, each having an aperture formed therein, wherein said second mounting bracket is pivotally connected to said second end of said adjustable tensioning arm at a point between said apertures in said ears and wherein said second mounting bracket is adapted to be fixedly connected to an engine.

2. The device of claim 1 wherein said first and second threaded rods are threaded oppositely.

3. The device of claim 2 wherein said first and second ends of said internally threaded tube are threaded oppositely.

4. The device of claim 1 wherein one of said ears includes an offset portion.

5. The device of claim 1 wherein said first and second threaded rods include jamb nuts threaded thereon.

6. An engine and tensioning device assembly, comprising:

(a) component A, (b) a belt connected to component A, and (c) a tensioning device secured at a first end to component A and at a second end to said engine, the tensioning device comprising
   (i) a middle member having a first end and a second end,
   (ii) a first end member threadingly engaged with the first end of the middle member to provide a first degree of adjustment,
   (iii) a second end member threadingly engaged with a second end of the middle member to provide a second degree of adjustment, and
   (iv) a bifurcated connection member defining a threaded bore adapted to threadingly receive the second end member to provide a third degree of adjustment, wherein component A is movable when said first, second and third degrees of adjustment are adjusted and said engine is not movable when first, second and third degrees of adjustment are adjusted.

7. The engine and tensioning device assembly of claim 6 wherein component A is an alternator.

8. A tensioning device comprising:
(a) an adjustable tensioning arm having first and second opposed ends, said adjustable tensioning arm comprising
  (i) an elongated threaded rod, and
  (ii) an elongated bifurcated connection member having a threaded hole formed therein that adjustably receives said threaded rod, said elongated bifurcated connection member including opposed members each having an aperture formed therein,
(b) a first mounting bracket secured to said first end of said adjustable tensioning arm, and
(c) a second mounting bracket including two angulary extending ears, each having an aperture formed therein, wherein said second mounting bracket is pivotally connected to said second adjustable tensioning arm at a point between said apertures in said ears, and wherein said mounting bracket is adapted to be fixedly connected to an engine.

9. The device of claim 8 wherein said elongated threaded rod includes a jamb nut threaded thereon.

10. The device of claim 8 wherein one of said ears includes an offset portion.

11. A method of adjustably tensioning a belt using a device having an adjustable tensioning arm and first and second mounting brackets connected to the ends thereof, said first mounting bracket being affixed to component A and said second mounting bracket being affixed to component B, said belt being coupled to component A, said method comprising the steps of:
(a) providing a middle member having a first end and a second end, a first end member threadingly engaged with the first end of the middle member, a second end member threadingly engaged with the second end of the middle member, and a bifurcated connection member threadingly engaged with the second end member,
(b) lengthening said adjustable tensioning arm, said lengthening of said adjustable tensioning arm comprising the steps of
  (i) loosening a pair of elements for preventing rotation of the middle member, and
  (ii) rotating said middle member, such that first and second end members engaged with said first and second opposed ends of said middle member respectively extend further therefrom,
  (iii) rotating the second end member with respect to the bifurcated connection member,
  wherein said lengthening of said adjustable tensioning arm causes component A to move, thereby tensioning said belt, and
(b) tightening said pair of elements for preventing rotation of said middle member.

12. The method of claim 11 wherein said pair of elements for preventing rotation of said middle member comprises a pair of jamb nuts.

13. The method of claim 11 wherein said middle member comprises an internally threaded tube, wherein said first end member comprises a first externally threaded rod and wherein said second end member comprises a second externally threaded rod.

* * * * *